US006845486B2

(12) United States Patent
Yamada et al.

(10) Patent No.: US 6,845,486 B2
(45) Date of Patent: Jan. 18, 2005

(54) USER SUPPORT METHOD AND USER SUPPORT APPARATUS

(75) Inventors: Teruhiro Yamada, Osaka (JP); Takashi Hazui, Auchi (JP); Mutsumi Ikeda, Saitama (JP); Manabu Kondo, Gunma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 625 days.

(21) Appl. No.: 09/823,261

(22) Filed: Mar. 30, 2001

(65) Prior Publication Data

US 2002/0054163 A1 May 9, 2002

(30) Foreign Application Priority Data

Jun. 30, 2000 (JP) ........................... 2000-200306

(51) Int. Cl.[7] .................... G06F 3/00; G06F 17/60
(52) U.S. Cl. ............... 715/706; 715/705; 715/714; 715/738; 715/848; 715/968; 707/3
(58) Field of Search ..................... 345/700, 705, 345/706, 714, 733, 738, 764, 848, 968; 707/3, 10; 709/201, 217

(56) References Cited

U.S. PATENT DOCUMENTS

| | | | |
|---|---|---|---|
| 6,032,129 A | * 2/2000 | Greef et al. | 705/27 |
| 6,256,043 B1 | * 7/2001 | Aho et al. | 345/629 |
| 6,369,811 B1 | * 4/2002 | Graham et al. | 345/764 |
| 6,401,122 B1 | * 6/2002 | Matsui et al. | 709/227 |
| 6,466,975 B1 | * 10/2002 | Sterling | 709/223 |
| 6,489,968 B1 | * 12/2002 | Ortega et al. | 345/713 |
| 6,572,662 B2 | * 6/2003 | Manohar et al. | 715/526 |
| 6,604,681 B1 | * 8/2003 | Burke et al. | 235/383 |

OTHER PUBLICATIONS

Jennifer Rowley, Shopping bots: Intelligent shopper or virtual department store?, 2000, International Journal of Retail & Distribution Management, v28 n7 p. 297–306.*
M. Sakaguchi et al, "A shopping assistant agent for Webshops", Aug. 1999, Internet Applications IEEE Workshop, pp. 30 37.*
Rochelle Garner, "Mall–ing it over", Jun. 1994, PC Week, v11, n22, p. A9(1).*
"7th Level and Net Perceptions in Major New Technology Pact." Jul. 1998, Business Wire, p7171026.*
Richard Shulman, "Internet opportunities", Dec 1996, Supermarket Business, v51, n12, p. 29(2).*
Ellis Booker, "Retailer wary of electronic commerce", Oct. 1994, Computerworld, v28, n43, p. 20(1).*
Emmet Davis et al, "Towards a Theory for a Sociable Software Architecture", 1998, American Association for Artificial Intelligence, p. 27–34.*
J. Ben Schafer, "Recommender Systems in E–Commerce", 1999, Department of Computer Science and Engineering University of Minnesota, p. 158166.*

(List continued on next page.)

Primary Examiner—X. L. Bautista
(74) Attorney, Agent, or Firm—Christensen O'Connor Johnson Kindness PLLC

(57) ABSTRACT

User support method and user support apparatus for facilitating a user to find desired information from an enormous size of Web sites in a user friendly manner so as to make efficient use thereof. A front processor functions at a level of interface with a user. A middle processor processes and stores information to be supplied to the user via the front processor. The front processor stores object data which describe a virtual three-dimensional space containing a plurality of virtual rooms, which respectively correspond to different concepts, and a specialized agent which performs a service related to the concept corresponding to each of the rooms. When the service is requested by the user, the specialized agent asks the middle processor about information necessary for providing the service.

2 Claims, 16 Drawing Sheets

OTHER PUBLICATIONS

"Fingers that shop around Retailing faces an upheaval caused by 'intelligent agents' on the Internet, writes Vanessa Houlder", Sep. 1996, Financial Times London Edition, p. 14.*

Joanie Wexler, "AT&T virtual mall to open doors", Jun. 1995, Network World, v12 n23 p. 17,20.*

"Cozone.com and Artificial Life Provide Virtual Sales Reps for Web Site Visitors", Dec. 1999, PR Newswire.*

Katia Sycara et al, "Coordination Of Multiple Intelligent Software Agents", 1996, International Journal of Cooperative Information Systems, v5 n2–3 p. 181–211.*

\* cited by examiner

FIG. 10

```
                                               370
┌─────────────────────────────────────────┐
│ URL : www.kondate.com                    │
│ COOKING STYLE : CHINESE                  │
│ NAME OF MATERIAL : ○○○                   │
│ NUMBER OF PEOPLE : FOR ○ PEOPLE          │
│ MATERIAL LIST : ○○ IS ○ GRAMS · · ·      │
│ HOW TO COOK : ①· · ·                     │
│ COOKING TIME : ○ MINUTES                 │
│ COMPOSITIONS : CALCIUM : ○ GRAMS · · ·   │
│ CALORIES : ○○Kcal                        │
└─────────────────────────────────────────┘
```

FIG. 14

| KEYWORD | DELETION | OBJECTIVE KEYWORD |
|---|---|---|
| A | 1 | A1 |
|   |   | A2 |
| B | 0 | B1 |
|   |   | B2 |

404

USER SUPPORT METHOD AND USER SUPPORT APPARATUS

BACKGROUND OF THE INVENTION

1. Field of the Invention

The present invention relates to technology to electronically support a user, and particularly to a user support method and apparatus which provides data processings search and retrieval for information requested by a user.

2. Description of the Related Art

With the advance of Internet usage, its principal application, the WWW (World Wide Web), is being utilized at an incredibly increasing rate of growth such that the dispatch and search for information over the Web is extremely widespread. With increased dispatch and circulation of information on the Internet, it becomes an undeniable fact that most of the information desired by a user can be found at some Web site on the Internet. However, since there are an incredibly large number of Web sites available, as well as an even larger number of pages to be searched, it is actually getting more and more difficult to find the desired information even though it is most probable that the information exists somewhere on the Internet.

In portal sites used for Internet searches, hierarchical organization of data and refinement of search methods have been attempted. Thus, desired information can be efficiently located and retrieved from among the flood of information available on the Internet by effectively using a search condition such as the logical sum and logical product.

Since Internet usage is no longer limited to users with extensive experience, but is increasingly accessed by users who are not accustomed to online searches for information, it is unrealistic to expect new users to smoothly handle highly sophisticated search formulae or the like. Moreover, there are many occasions where users cannot clarify the classification of the information they are attempting to retrieve due to deepened hierarchical schemes of today. Increasing the number of Internet users is an important theme today to further a national policy based on founding of a science and technology state. Thus, considering the fact that nationwide corporations and industries that provide software and hardware are also directly involved with the healthy spread of the Internet culture, providing efficient, user-friendly Internet-use technology is an important and urgent theme.

SUMMARY OF THE INVENTION

The present invention is intended to address the aforementioned circumstances, and an object thereof is to provide technology that will enable users to more easily and effectively search, retrieve and utilize desired information.

Another object of the present invention is to provide a user support technique allowing users to benefit from a network use technology in a user-friendly environment.

One aspect of the present invention relates to a user support apparatus (hereinafter referred to simply as "the apparatus" or "the present apparatus"). The present apparatus comprises: a front processor which handles data exchange between a user and the apparatus at an interface level, and a middle processor which processes and stores information to be supplied to the user via said front processor. The front processor is a combination of hardware and software useful for communicating between the user and the present apparatus, and a functional unit in combination and cooperation thereof.

The front processor includes an object storage unit. The object storage unit stores object data. The object data include data on a virtual three-dimensional space containing a plurality of virtual rooms, which respectively correspond to different concepts, and a personified specialized computer character representing an agent that performs services related to the concept corresponding to each of the rooms. The term "personified" is not limited to the form of a human, but may be represented by whatever embodiment imitates human-like communication. The front processor further includes a three-dimensional object-outputting unit that displays the virtual three-dimensional space and the specialized agent to the user.

The specialized agent requests information from the middle processor, which is necessary for providing services requested by the user. The middle processor retrieves the necessary information, if stored internally, and supplies the retrieved information to the specialized agent. Information stored internally includes not only information stored in an internal portion of the middle processor, but also internally anywhere in the present apparatus.

According to this structure, the personified specialized agent provides services in the virtual rooms provided in the virtual three-dimensional space of the front processor. Each room is related to a particular concept, and the specified agent of the room performs a service for a user related to the particular concept so that the user can receive the service in an effective manner that can be intuitively understood. Such a service may include, among other things, retrieval of search information desired by the user associated with the particular concept of the selected agent.

The apparatus may further include a back processor which supplies the information necessary to support the services to the user to the middle processor by externally acquiring the information according to an instruction from the middle processor when the information is not stored internally. The back processor may include a three-dimensional object supply unit, which sends the object data to the front processor. In that case, the distributed object data is stored in the object storage unit.

The back processor may also function as a server of the object data for the front processor via the Internet or other computer networks. The server may, for example, act as a Web server or a service entity on other Internets, in which case the three-dimensional object supply unit may be one of the following: one in which a major portion of the processing remains on the server side, such as CGI (common gateway interface); one in which a major portion of the processing moves to the client side, such as a Java (trademark) applet and ActiveX (trademark); one in which Java applications or other API (Application Program Interface) types in which a major portion of the processing is performed on both the server and client; or other modes.

In this case, a local agent which is supported initially in the front processor without any supply from the back processor and a remote agent which exists as a result of supply from the back processor may be stored in the object storage unit. The local agent may be easily customized for each device, and can be utilized even if the present apparatus is off-line since the local agent exists locally. On the other hand, the remote agent is preferably provided from a server allowing the agent to be usable among a plurality of devices, and moreover the remote agent may be easily updated and newly registered by the settings at the server side. The local agent and the remote agent may be provided in a manner that they are not distinguishable from the user side. In that case, a so-called seamless support environment is provided.

The three-dimensional object supply unit may supply the object data in a manner such that a user individual agent (hereinafter referred to as "My Agent") corresponding to each user may freely move in the virtual three-dimensional space so as to guide the user. The individual agent's movement is not limited to the virtual rooms and may be incorporated in the remote agent. Utilization of My Agent further increases user convenience.

The object data may be generated such that an advertisement is positioned within and embedded in the visible space when the user enters the virtual room in a virtual manner, and the advertisement may be provided with a link to an information source, such as the site of a company which offers advertised merchandise, to be accessed via the back processor.

The object data may be generated in a state such that a receiving agent representing an actual reception personnel is contained in a visible space when the user enters the virtual room in a virtual manner, and a communication channel may be formed so that the actual reception personnel and the user have a virtual conversation via the back processor when the user requests the receiving agent to supply data. The "actual reception personnel" means a sales person or a servicing person in a company who actually stands ready assuming that the user will ask questions to the receiving agent. The "communication channel" may be, besides the known chat function via a network, a usual voice communication by an access to the receiving agent.

The middle processor comprises a meta-information generator which analyzes the necessary information supplied from the back processor as a page which is a collected set of data, and generates meta-information relative to the page; and a write controller which relates the page to the meta-information so as to be stored in a local memory device. The "meta-information" indicates information on the contents of the page based on the concept that meta-data means "data on data".

By implementing this structure, the page and the generated meta-information may be combined, one may be embedded into another, or they may be correlated by a method in which link data is provided therebetween and so forth. They are stored in a local memory device in such a state. Thereby, the contents or a subject of the page can be easily known in a broad sense, or can be searched, and the page can be read out faster in general than a global search as long as the page exists in the local memory device, for example, in a cache memory.

The meta-information generator may further include: a keyword detector which detects a keyword included in the page; a subject analyzer which analyzes a subject of the page, such as the object or theme of the page, based on the keyword detected by the keyword detector; a meta-information extracting unit which extracts meta-information from the page based on the subject determined as a result of analysis by the subject analyzer. In that case, the extracted meta-information is correlated with the page so as to be stored in the memory device.

The meta-information may further include a precheck unit which judges whether or not the page is a desired page so that, when the page is judged as undesirable, storage of the page into the memory device may be stopped. Conversely, when the page is judged as desirable, it may be stored in the memory device.

The middle processor may further include a cache-searching unit. The cache-searching unit judges whether or not a page describing the information already exists in the local memory device by comparing the keyword to the meta-information stored in the memory device. When the page exists, the cache-searching unit may instruct to read out the page from the memory unit. When the page does not exist, the cache-searching unit may instruct to conduct the search again. When the search is conducted again, a page thus obtained may be processed by the meta-information generator so that the meta-information thus generated may be correlated with the page so as to be stored in the memory device.

The middle processor may further include a search-preprocessing unit which performs a predetermined process on a keyword reflecting the search criteria of the user so as to support the search conducted by the back processor. Preferably, the search-preprocessing unit includes: a condition-adding unit which adds an objective keyword according to the search criteria of the user determined from a keyword reflecting the intention of the user; and a search formula-setting unit which sets a conditional equation including the form of, for example, the logical sum, based on the keyword and the added keyword.

The middle processor may further include a pre-search controller that assumes information that the user will inquire based on a user's individual data. In that case, the process of the pre-search for the assumed information may be executed in the background, specifically, the process may be delayed as instructed by the user, and the search will be executed while the user is not using the present apparatus by giving an instruction to the back processor. By storing the page thus obtained in the memory device together with the meta-information, inquiries from the user can be dealt with in a speedy manner.

In a preferred embodiment of the present invention, the middle processor is installed in a home server, and the front processor is installed in an appliance controlled by a home server. The middle processor supplies operational data on the appliance to the user, and the middle processor reinforces the operational data so that it is sent to the front processor.

In another preferred embodiment, the back processor is installed in a server on a network such as a Web server, and the front processor is installed in an appliance accessible to the server such as a personal computer or a mobile terminal including a portable telephone. Preferably, the front processor accepts a request for supply of information from the user, and the back processor acquires the requested information from an information source on the network so as to be sent to the front processor.

Another aspect of the present invention relates to a method of supporting a user. Preferably, the method comprises: a front process which handles data exchange between a user and the apparatus at an interface level; and a middle process which processes and stores information to be supplied to the user via said front process.

Preferably, the front process includes the steps of: displaying to the user a virtual three-dimensional space containing a plurality of virtual rooms, which respectively correspond to different concepts, and a personified specialized agent which performs a service related to the concept corresponding to each of the rooms; and the specialized agent's inquiring of the middle process about information necessary for providing the service when the service is requested by the user.

Preferably, the middle process includes the steps of: reading out the necessary information, if stored internally, so as to be supplied to the specialized agent; and assigning a process to externally acquire the necessary information from an information source connected to the network when the necessary information is not stored internally. In this structure too, the user can efficiently receive a service including search of desired information in a user-friendly manner.

Moreover, this summary of the invention does not necessarily describe all essential features so that the invention may also be sub-combination of these described features.

BRIEF DESCRIPTION OF THE DRAWINGS

FIG. 10 shows an example of a meta-information file 370 generated.

FIG. 14 shows an example of internal data of a reference table 404.

DETAILED DESCRIPTION OF THE INVENTION

The invention will now be described based on the preferred embodiments, which are not intended to limit the scope of the present invention, but rather exemplify the invention. All of the features, and the combinations thereof, described in the embodiments are not necessarily essential to the invention.

FIGS. 1 to 4 show various examples of a user support apparatus according to preferred embodiments. In any of the embodiments, the user support apparatus is comprised of various combinations of three principal processing components, namely, a front processor 12, a middle processor 14, and a back processor 20. The front processor 12 handles the exchange of information between a user and the apparatus. The middle processor 14, which is designed to back up the communications between the apparatus and the user in the front processor, obtains and stores information desired by the user in the form suited to each individual user. The back processor 20 collects information requested by the user from a computer network, namely, the Internet, and supplies it to the middle processor 14. To reinforce user support by the front processor 12, the back processor 20, acting as a server, further provides a virtual three-dimensional space that includes a specialized agent as described herein.

Figure 1:
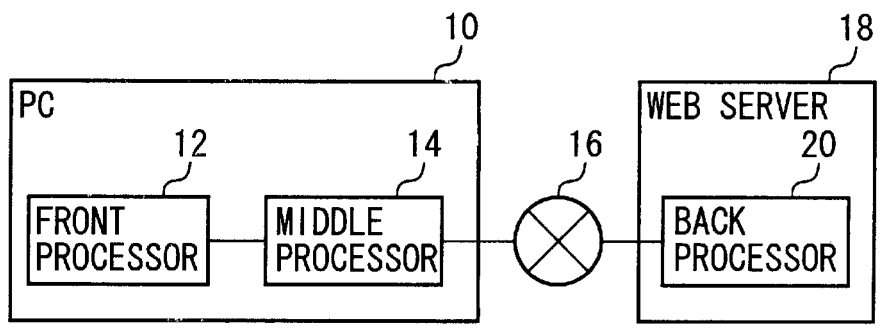
FIG. 1 shows a structure of a user support apparatus according to an embodiment of the present invention.

Referring now to the example of FIG. 1, the user support apparatus comprises the front processor 12 and the middle processor 14, which are both installed in a PC (personal computer) 10 or other computerized device. However, a structure to which the back processor 20 is added and combined may also be regarded as the user support apparatus, and it is to be appreciated that this freedom of combination applies throughout this patent application. The middle processor 14 communicates via the Internet 16 with a Web server 18, which has the back processor 20 installed therein.

Figure 2:
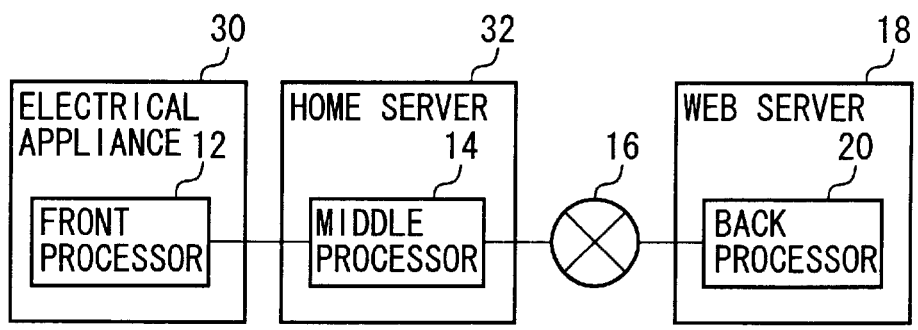
FIG. 2 shows a structure of a user support apparatus according to another embodiment of the present invention.

Referring now to the example of FIG. 2, the front processor 12 is installed in an electrical appliance 30 and the middle processor 14 is installed in a home server 32, with the middle processor 14 communicating via the Internet 16 with the back processor 20 installed in a Web server 18. The electrical appliance 30, which is managed by the home server 32, can be audiovisual (AV) equipment, such as a digital television set, video recorder or digital camera, a home electronics appliance, such as a refrigerator or washing machine, a home security device containing sensors, or any other of various electronic apparatuses. For example, the front processor 12 may manage the information displayed on the liquid crystal display panel provided on a refrigerator, receiving and processing instructions from the user on freezing or refrigeration or reporting on the current condition of the freezer compartment or the icemaker. The middle processor 14, on the other hand, may display a variety of information beyond the operational data on the refrigerator, such as "Today's Recommended Recipe."

Figure 3:
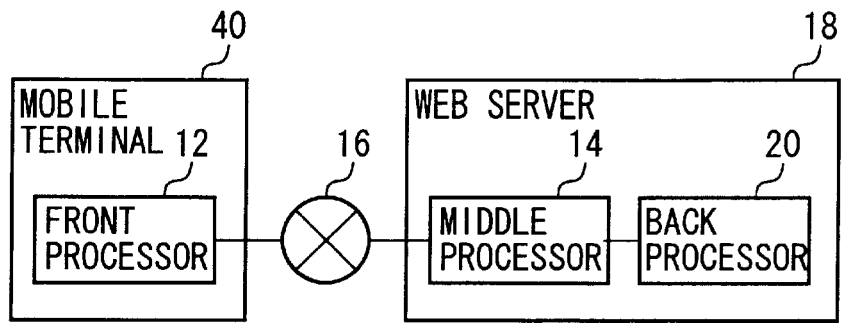
FIG. 3 shows a structure of a user support apparatus according to still another embodiment of the present invention.
Figure 4:
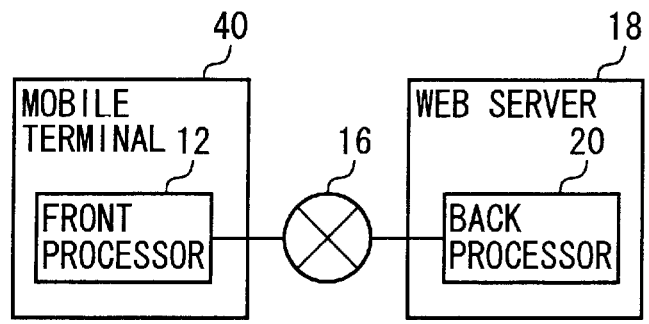
FIG. 4 shows a structure of a user support apparatus according to still another embodiment of the present invention.

Referring now to the example of FIG. 3, the front processor 12 is installed in a mobile terminal 40, such as a portable telephone or handheld computing device, whereas the middle processor 14 and back processor 20 are installed in a Web server 18. The mobile terminal 40 and the Web server 18 are able to communicate with each other via the Internet 16. In this example, the load on the mobile terminal 40 is lightened by also placing the middle processor 14 in the Web server 18. In the example shown in FIG. 4, the structure is similar to the one shown in FIG. 3, with the exception that only the back processor 20 is installed in the Web server 18 so that a simplified service without processing by the middle processor 14 can be offered.

Figure 5:
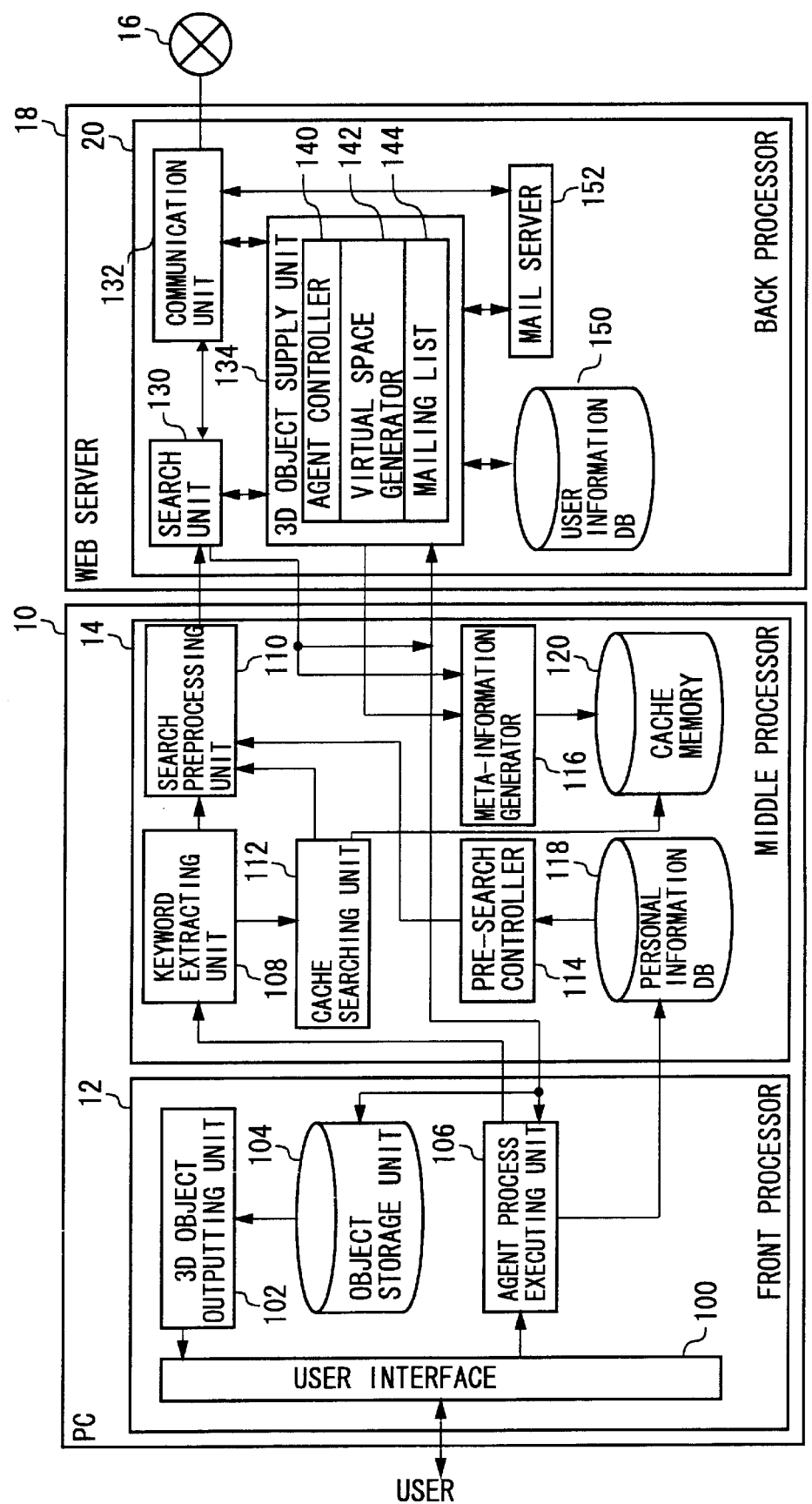
FIG. 5 shows, as an example of various embodiments, a structure of a user support apparatus corresponding to the preferred embodiment shown in FIG. 1.

FIG. 5 shows, as an example of various embodiments, a structure of a user support apparatus corresponding to the preferred embodiment shown in FIG. 1. The PC 10, equipped with the normal functions of a personal computer, is comprised of a CPU, a memory and application programs loaded into memory with user support functions. The schematic diagram of FIG. 5, however, only shows the functional blocks characteristic of the preferred embodiments of the present invention. It is to be understood by those skilled in the art that these functional blocks can be realized in various forms through the use of hardware only, software only or any combination thereof.

The front processor 12 and the middle processor 14 are preferably installed in the PC 10, and the back processor 20 is preferably installed in the Web server 18 in order to enable communication between the PC 10 and the Web server 18. Referring to FIG. 5, the middle processor 14 and the back processor 20 are illustrated side by side to clarify the exchange of information between them, but in the actual configuration the Internet 16 exists between them to effect intercommunication thereof via their respective communication interfaces.

The front processor 12 includes a user interface 100, which is a generic name for all the functions accessible by the user to enable interface with the apparatus, such as supplying information to the user or accepting instructions from the user. Thus, the user interface 100 includes input devices, such as a keyboard and a mouse, a display unit to display information for the user, and graphical user interface (GUI) and other programs.

An object storage unit 104 stores object data that describes a virtual three-dimensional (3-D) space (hereinafter referred to simply as "virtual space") displayed to assist the user, and a personified agent character with specialization in different areas (hereinafter referred to as a "specialized agent") who engages in dialogues with the user in the virtual space in order to deter user wishes. The object data is displayed to the user via a 3-D object-outputting unit 102. Part of the object data is held by the front processor 12 from the beginning, whereas other object data is supplied from a 3-D object supply unit 134 (described later) in the back processor 20.

The virtual space contains a plurality of virtual rooms, which respectively correspond to different abstract concepts. The concepts correspond to areas or topics the user may be interested in, such as cooking, travel, money, movies, personal computing, science and new products. The specialized agents, who reside in any of their respective virtual rooms, are responsible for providing services relative to the concepts assigned to the rooms. These services may include supplying detailed information, handling the purchase of products for the user, answering questions asked by the user, or the like.

The specialized agents are generally classified into local agents and remote agents. The local agents, which are functions locally present in the front processor 12, can offer guidance information to the user mainly about functions intrinsic to the PC 10. Therefore, the local agents can be realized by the operating system functions of the PC 10 or the functions of various application programs installed in the PC 10. According to the present embodiment, the local agents are also displayed in the virtual space or nearly virtual three-dimensional space (hereinafter referred to simply as "virtual space"), and wait for instructions from the user. The agents are structured in a manner such that the user is not particularly conscious of the difference between the local agents and the remote agents.

The remote agents, on the other hand, are functions supplied from the 3-D object supply unit 134. After being downloaded into an object storage unit 104, the remote agents can remain in the object storage unit 104 permanently or can be erased therefrom upon completion of communication between the PC 10 and Web server 18, or the arrangement can be such that the user can choose either of these two options. The choice of any of the aforementioned modes can be made in consideration of the service policy of offering constantly updated remote agents to the user, convenience of local access for the user and other conditions.

The remote agents reside in their respective rooms and wait for a virtual visit by the user. In the present embodiment is a special agent known as "My Agent" for each individual user and whose sphere of action covers the entirety of the virtual space without being confined to the space within a room. My Agent, which is provided for each user from the 3-D object supply unit 134, guides the user into a room, wherein information desired by the user can be found, or helps provide services better customized to the user by acquiring personal information about the user. My Agent is provided with an interactive function to obtain individual data from the user to whom the agent is assigned so that, when the frequency of use by the user exceeds a predetermined level, the function is turned active as a "friend". Identification of the user by the back processor 20 is achieved by asking the user to enter his/her user ID and password or to store them as cookies.

An agent process-executing unit 106 executes necessary processes when a user gives instructions to any of the specialized agents through the user interface 100. For example, when the user seeks some special information from a specialized agent, the specialized agent asks the middle processor 14 for necessary information. If the necessary information is stored in a cache memory 120, the middle processor 14 reads it out and supplies it to the specialized agent. If the necessary information is not stored in the cache memory 120, the agent process-executing unit 106 transmits instructions to the back processor 20 to acquire the information from an arbitrary site on the Internet 16 and send it back to the middle processor 14. The information acquired via the Internet 16, as above described, is called a page after the manner of the HTML file format concept. The middle processor 14 supplies the page sent back from the back processor 20 to the user and at the same time processes and stores the page in the cache memory 120 in preparation for future access by the user. The middle processor 14 will be described in more detail at a later stage.

A search unit 130 in the back processor 20 conducts a search via a communication unit 132 for the page requested by the middle processor 14. It should be made clear that the search unit 130 may be a meta-search engine capable of searching through a plurality of search engines that exist external to the apparatus, thereby saving users time while possibly eliminating a biased search.

An agent control unit 140 and a virtual space generator 142 in the 3-D object supply unit 134 supply a remote agent and a virtual space, respectively, as object data to the front processor 12. The agent control unit 140 carries out the generation and management of remote agents. Generated as object data as part of the appearance and sound of remote agents are its image data, dialog data reflecting special knowledge, and various attribute data for characterization. When a remote agent is assigned to a job by the user at the front processor 12, the information thereon is acquired by the agent control unit 140, and a search for pages and other necessary processes are performed. Individual data on the user is preferably obtained from questionnaires, the user's dialogs with other specialized agents, or through other routes, and is stored in a user information database 150 in order to provide information meeting the user's taste and to achieve better customized functions of My Agent. It should be appreciated that the virtual space and the remote agents may also be described in another language, such as VRML (Virtual Reality Modeling Language), and in this case, the virtual space generator 142 may provide the use with a VRML viewer.

The 3-D object supply unit 134 further incorporates a mailing list 144. The mailing list 144 keeps a record of electronic mail addresses of the users who have visited the rooms included in the virtual space. For example, if the room is a "PC Room", then it is highly likely that the users who visit this room are interested in purchasing PCs. Accordingly, recording such users in the mailing list 144 may enable an advertisement delivery service via e-mail. A mail server 152 may be an SMTP (Simple Mail Transfer Protocol) server, which operates so-called push technology services.

Figure 6:
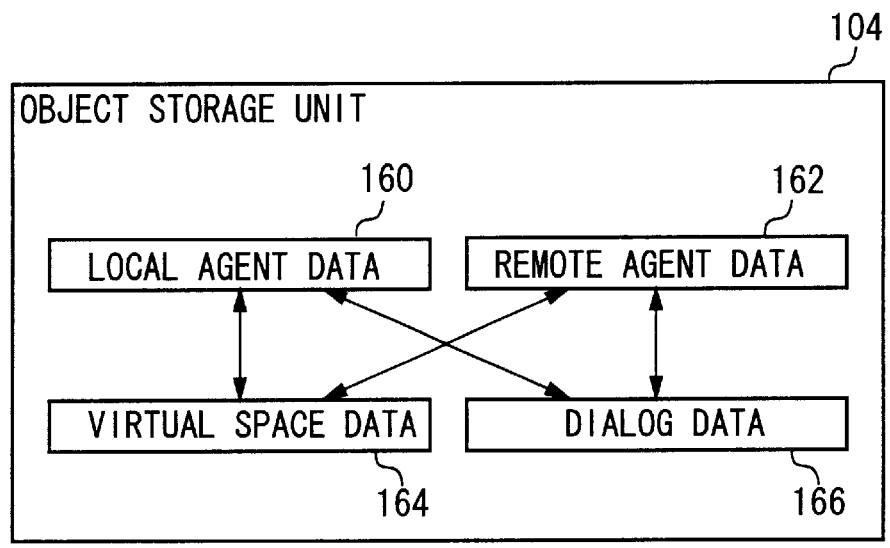
FIG. 6 shows internal data stored in the object storage unit 104.

FIG. 6 shows internal data stored in the object storage unit 104. Local agent data 160 and remote agent data 162 are each linked with virtual space data 164 and dialog data 166. A plurality of local agents is described in the local agent data 160. The data on the rooms where the local agents reside and stand ready, and the data on typical dialogs with the users, are described in the virtual space data 164 and the dialog data 166, respectively. The same data storage approach applies to the remote agents as well.

Figure 7:
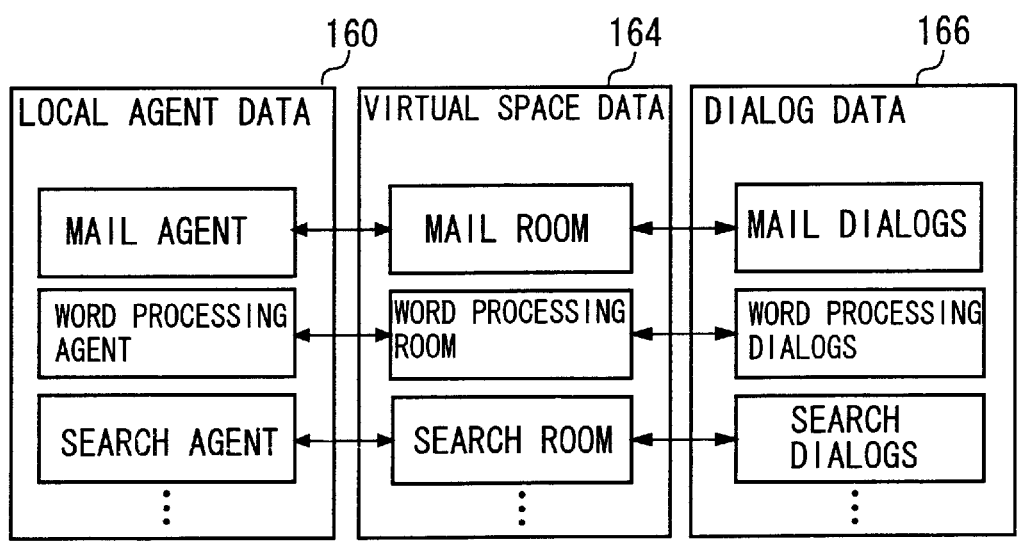
FIG. 7 shows a data structure of the local agent shown in FIG. 6 in more detail.

FIG. 7 shows a data structure of the local agent shown in FIG. 6 in more detail. A mail agent, a word processing agent and a search agent are recorded in the local agent data 160, and are related respectively to a mail room, a word processing room and a search room in the virtual space data 164 and further to mail dialogs, word processing dialogs and search dialogs in the dialog data 166, respectively.

Figure 8:
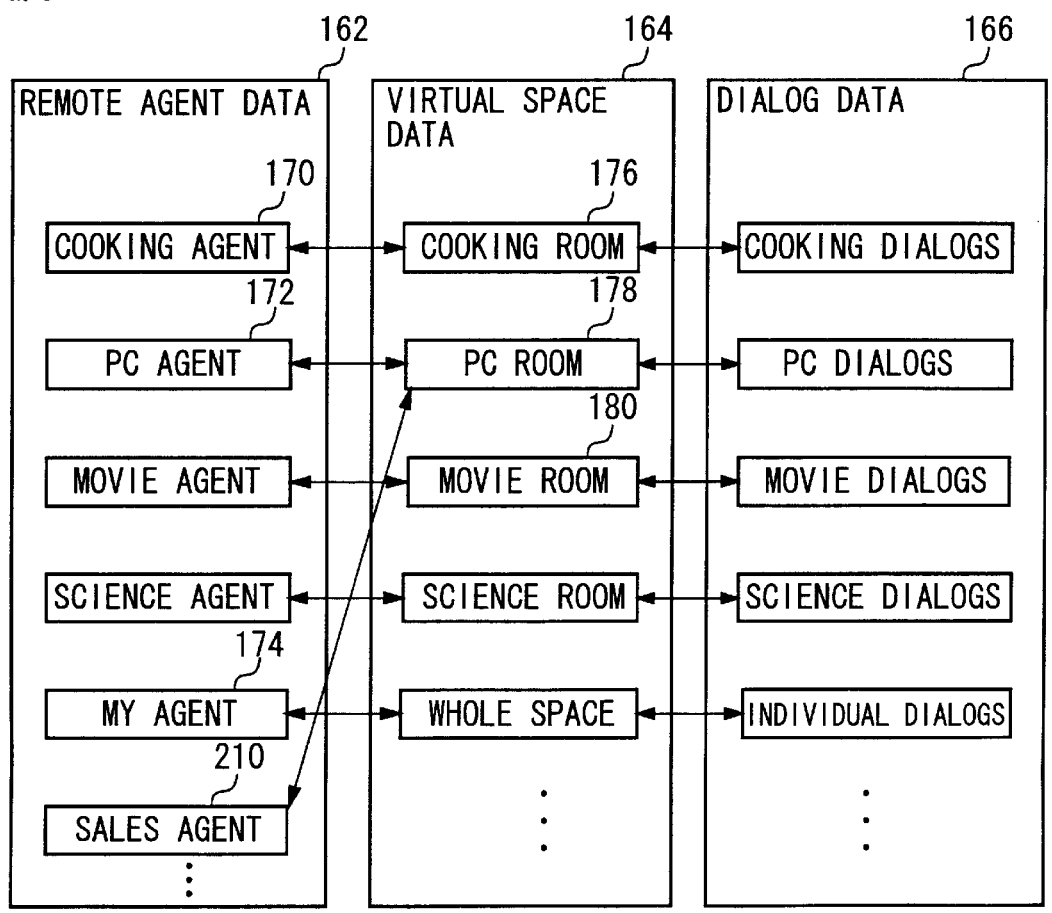
FIG. 8 shows a data structure of the remote agent shown in FIG. 6 in greater detail.

Similarly, FIG. 8 shows a data structure of the remote agent shown in FIG. 6 in greater detail. A cooking agent 170, a PC agent 172, a movie agent, a science agent, my agent 174 and a sales agent 210 are recorded in the remote agent data 162, and are linked respectively to a cooking room 176, a PC room 178, a movie room 180, a science room and a whole space in the virtual space data 164 and further to cooking dialogs, PC dialogs, movie dialogs, science dialogs and individual dialogs in the dialog data 166.

Both the local agent and the remote agent are provided with the functionality to run a morphological element analysis on the user's request sentence, the function to extract what appears to be a keyword thereof, and the function to select an appropriate dialog from the applicable dialogs by association from the keyword, attempt to narrow down the request of the user to its core. This narrowing down of the user's request may not always work successfully; therefore, also provided is a function in which the user can input a keyword or keywords for a desired search directly or activate a certain application directly.

There is provided a space for pasting advertisements in the data of each of the rooms in the virtual space data 164 as described later herein. The advertisements are positioned within the visible space when the user enters the room so that the user, by clicking on any of the advertisements, can jump to the advertiser's Web site or other similar site via the back processor 20. Thus, the data on each of the rooms include a description for pasting image data advertisement, a description for acquisition of a click on advertisement, or URLs to be set on a browser when clicked.

Referring to FIG. 8, My Agent 174, linked with "whole space" in the virtual space data 164, can show the user around the whole area of the virtual space. The data on this whole space includes information concerning the concepts and positions of all the different rooms by which a room can be specified according to the request from the user.

The sales agent 210 is a specialized agent, but unlike the other specialized agents, it functions as a receiving agent representing the functions reception personnel in the actual world. Namely, there are actual sales persons behind this sales agent 210 who will join in a system forming necessary communication channels whereby they receive, via the back processor 20, questions addressed to the sales agent 210 by the user and engage in actual consultation with the user by offering answers or information on services through a chat function, e-mail or other means. In the example shown in FIG. 8, the sales agent 210 stands ready and waits for a user to access it in the PC room 178.

The front processor 12, in cooperation with the back processor 20, can provide services by the specialized agents who are positioned in the virtual space. Hence, the middle processor 14 is not essential to the cooperation between the front processor 12 and the back processor 20, and yet the middle processor 14 plays an important role in improving user convenience when a search for pages is requested from the front processor 12 so as to efficiently manage the pages. The functions of the middle processor 14 are now described in detail with reference to the diagram in FIG. 5.

The agent process-executing unit 106 receives a request input by the user, for example a search request sentence, via the above-mentioned search agent or the cooking agent 170. The description below uses an example where the cooking agent 170 (shown in FIG. 8) is used. The search request sentence normally takes the form of a natural sentence, such as "Want to know some recipes for dishes using beef". However, a keyword may alternatively be typed in from the beginning. The following is the case of the above natural sentence.

The search request sentence is sent to the keyword-extracting unit 108, where it is resolved into its morphological elements. Namely, mainly nouns—"recipes," "dishes" and "beef" here—are extracted as keywords reflecting the intent of the user. The keywords thus acquired are hereinafter referred to as "initial keywords," which will be distinguished from the keywords newly generated at the search-preprocessing unit 110 described later.

The initial keywords are then sent to the search-preprocessing unit 110, the functions of which will be described later. The initial keywords thus selected are not necessarily in the form optimal for online searches. Therefore, some keywords are eliminated and more appropriate keywords from a more objective point of view (hereinafter referred to as "objective keywords") are generated. Then the logical product, or AND operation, of the remaining initial keywords (hereinafter referred to as "selected initial keywords") and the objective keywords are taken, and the search formula thus obtained is sent to the search unit 130 in the back processor 20.

The search unit 130 carries out a search via the communication unit 132 for Web sites or their pages, using the above search formula, and returns the information thus found (hereinafter referred to simply as a "target page") to be sent to the agent control unit 140 or directly to the agent process-executing unit 106.

The target page is also sent to a meta-information generator 116. As described later, the meta-information generator 116 generates necessary meta-information, relates it to the target pages, and stores the data in the cache memory 120. Thereafter, the data in the cache memory 120 is put on standby for future searches by the user. The cache memory 120 may be a disk, a semiconductor memory or in any other form.

The initial keywords extracted by the keyword-extracting unit 108 are also sent to a cache-searching unit 112. Based on the keywords, such as "beef" as described above, the cache-searching unit 112 makes a search within the cache memory 120 and, if the pages desired by the user are already cached therein, reads the pages out locally from the cache memory 120. At the same time, instructions are given to the search-preprocessing unit 110 or the search unit 130 to give up any global search, which requires access to the Internet. The pages thus read are displayed for the user via the cooking agent 170. On the other hand, when desired pages do not exist in the cache memory 120, attempts are made to obtain such pages through the search-preprocessing unit 110 and the search unit 130 by accessing the Internet.

A personal information database 118 stores a variety of information concerning the user (hereinafter referred to as "individual data", "individual information", "personal data" or "personal information"), including permanent information, such as the user's interests and hobbies, and temporary information, such as the user's schedule for this week or menus he/she had this week. The individual data is obtained through the agent process-executing unit 106. It is to be appreciated here that the user support apparatus according to the present embodiments may also serve as a PIM (Personal Information Manager) (not shown) with such functions as a schedule managing function, a health care function of calculating calories of foods taken in, and an accounting function of recording purchases and costs, and may also store data obtainable from the use records of the above-described functions.

A pre-search controller 114 specifies information which may interest the user based on individual information stored in the personal information database 118 and sends keywords appropriate for the information to the search-preprocessing unit 110. Upon receipt of the keywords from the pre-search controller 114, the search-preprocessing unit 110 generates objective keywords and search formulas, and the search unit 130 executes a search accordingly. It is preferable that this process of the pre-search controller 114 starting a search be executed in the background. That is, this process may be operated during the night when the user does not use this apparatus, or even during the daytime when there is a certain lapse of time without access from the user, and/or when a mail program (not shown) attempts a dialup connection with the Internet to download electronic mail. In any case, processing in the background may conveniently create time for the operation of the meta-information generator 116.

Figure 9:
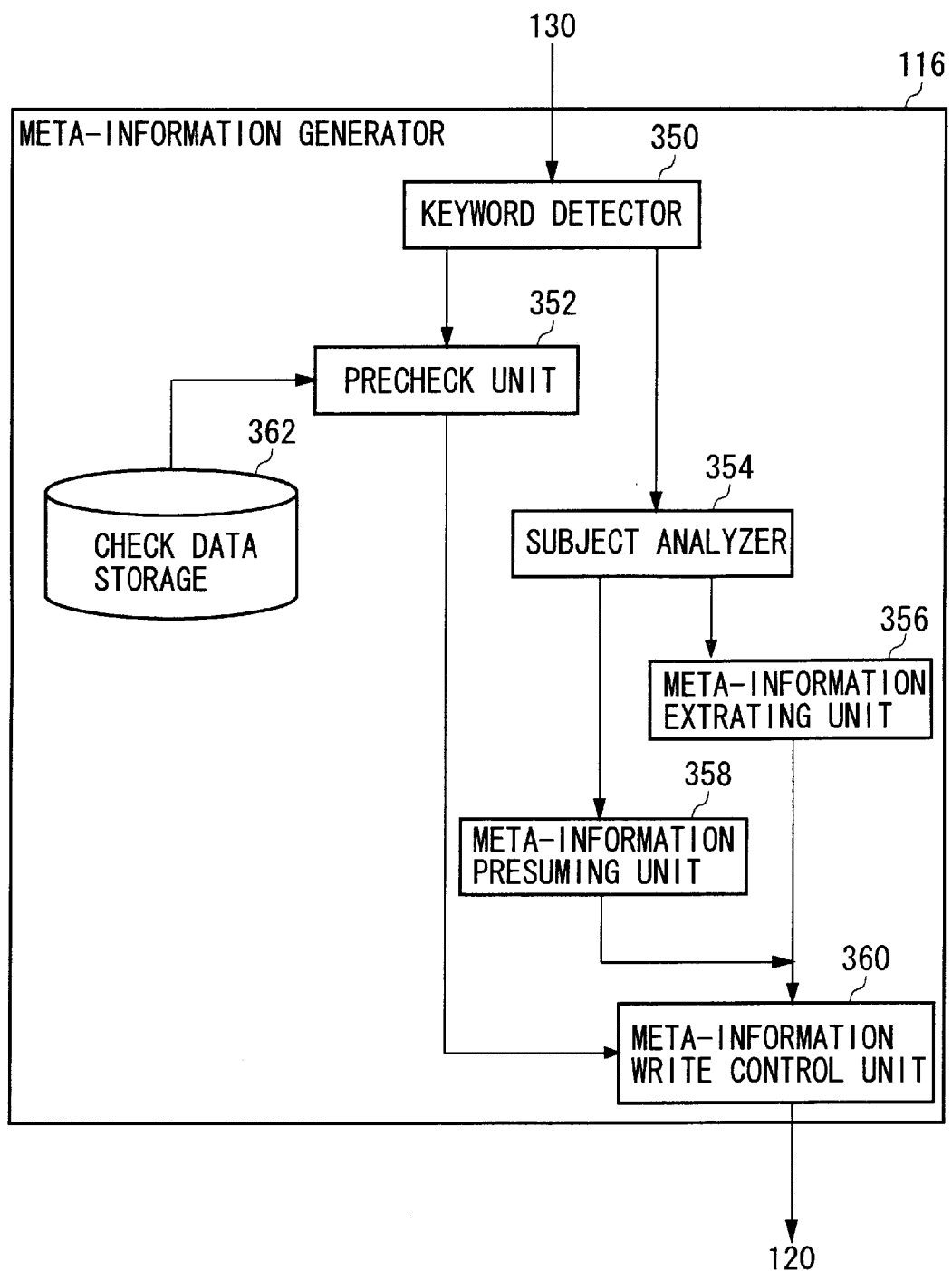
FIG. 9 shows an internal structure of a meta-information generator 116.

FIG. 9 shows an internal structure of the meta-information generator 116. The target pages sent from the search unit 130 are inputted to a keyword detector 350. The keyword detector 350 detects keywords from the target pages, using a morphological element analysis or some other known analysis method. The keywords thus detected (hereinafter referred to also as "keywords for checking") are sent to a precheck unit 352.

The precheck unit 352 makes a judgment as to whether the target pages are really those desired by the user, based on the data already stored in a check data storage 362. The check data storage 362 stores keywords with a high rate of correlation to each of the subdivided themes. For example, the broad classification of themes, just as shown in a portal site, may cover "News," "Computer," "Travel," "Gourmet," "Auctions," "Money," "Sports," "Entertainment," "Music", "Jobs" and so forth. And the middle classification under "Gourmet", for instance, may include "Restaurants around the Country," "Events," "Professional Menus," "Ethnic Cuisine," "Cooking Programs," "Nutrition" and "Gourmet Tips" and so forth. The check data storage 362, for instance, stores a large stock of keywords for each of these middle classification items which have been obtained by sampling the site pages listed in portal sites.

The precheck unit 352 matches up each of the keywords for checking against the keywords stored in the check data storage 362 and determines whether each of the keywords belongs to any of the above-described broad classifications or middle classifications. For example, suppose that as a result thereof a majority of the keywords for checking are found to belong to the broad classification item of "Gourmet," and that the above-described initial keywords, namely, "recipes," "dishes" and "beef," which show the intent of the user exist under "Gourmet". Then, the target pages are judged to have passed the correlation check. It is to be noted here that not only the broad classification item of "Gourmet" but also the middle classification item of "Professional Menus" may be used here. In such a case, the matching may be considered successful if, for example, 20 percent of the keywords for checking are found under "Professional Menus". In other words, the passing level may be set very low because the precheck unit 352 is not designed to carry out strict checking but rather to be able to reject pages which do not comply at all with user intent. The results of the checking are then communicated to a meta-information write controller 360.

A subject analyzer 354 performs functions similar to those of the precheck unit 352. Receiving keywords for checking from the keyword detector 350, the subject analyzer 354 identifies a broad or middle classification item, which contains more of the keywords for checking without having anything to do with the initial keywords. If the classification item thus identified is "Professional Menus," then the subject analyzer 354 judges that the subject of the target pages is "Cooking" or more specifically "Menus," and thus communicates "Menus" to a meta-information extracting unit 356 and a meta-information presuming unit 358.

Based on the determination that "Menus" is the subject of the target pages, the meta-information extracting unit 356 retrieves information concerning "Menus" from within the target pages and generates a file, which is a set of meta-information (hereinafter referred to as a "meta-information file"). FIG. 10 shows an example of a meta-information file 370 generated in the manner described above. Here, a cooking template with predetermined items, such as "Cooking style" and "Name of dish," is prepared in advance and information taken from the target pages is entered after the applicable items.

The meta-information presuming unit 358, shown in FIG. 9, presumes or guesses meta-information for the items of the meta-information file 370, for which applicable information could not be found in the target pages. For example, if information on "Calories" is among the items missing from the meta-information file 370, then it may be possible that the calories may be roughly calculated from data listed under "Composition" or "Materials" and, if necessary, "How to cook". The formulas for such calculations may be recorded in the meta-information presuming unit 358 when the cooking template is prepared. Similarly, when a travel template is prepared, items, such as "Required train ride time", "Transportation expenses" and "Tourist spots nearby"

may be listed and at the same time a function may be added whereby geographical information, train schedules, regional sight-seeing guidance and other information are obtained in advance for the presumption or guessing of meta-information in case such information cannot be found in the target pages. If the user's hobby is known to be traveling, the pre-search controller 114 may obtain data for meta-information presuming from the geographical and other information available on the Web, or may store in advance the pages, which are the source of such information, in the cache memory 120 as pages which may interest the user.

The meta-information file 370, which is generated by the meta-information extracting unit 356 and acquires added information from the meta-information presuming unit 358, is sent to the meta-information write controller 360. Where the keywords are accepted by the check at the pre-check unit 352, the meta-information write controller 360 correlates the meta-information file 370 with the target pages and stores the data in the cache memory 120.

Figure 11:
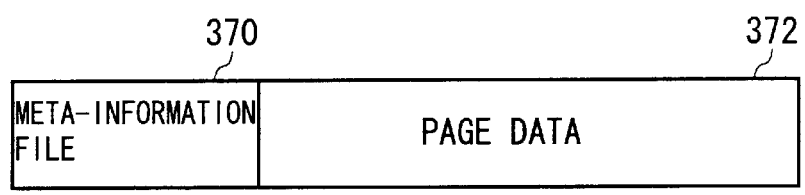
FIG. 11 illustrates how a meta-information file 370 is correlated with page data 372 of the target page.

FIG. 11 shows how a meta-information file 370 is correlated with page data 372 of the target page. Here, the contents of the meta-information file 370 are embedded in a header or at any other position of the page data 372. Accordingly, for example, the meta-information file 370 and the page data 372 may be generated as a single combined text file in XML (Extensible Markup Language). Thus, the file description shown in FIG. 10 may be embedded after being converted into a description such as follows:

```
<Menu meta-information>
<URL>www.kondate.com</URL>
<Cooking style> Chinese </cooking style>
 .
 .
</menu meta-information>
```

Figure 12:
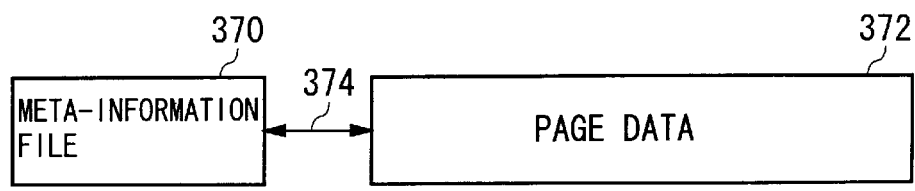
FIG. 12 illustrates another case of correlation of the meta-information file 370 with the page data 372 of the target page.

FIG. 12 shows another case of correlation of the meta-information file 370 with the page data 372 of the target page. Here, the meta-information file 370 is generated as a separate file from the page data 372, and link information 374 to link them is recorded separately. In this case, a search by the cache search unit 112 is directed at the meta-information file 370, and desired pages are read out from the cache memory 120 via the link information 374.

Figure 13:
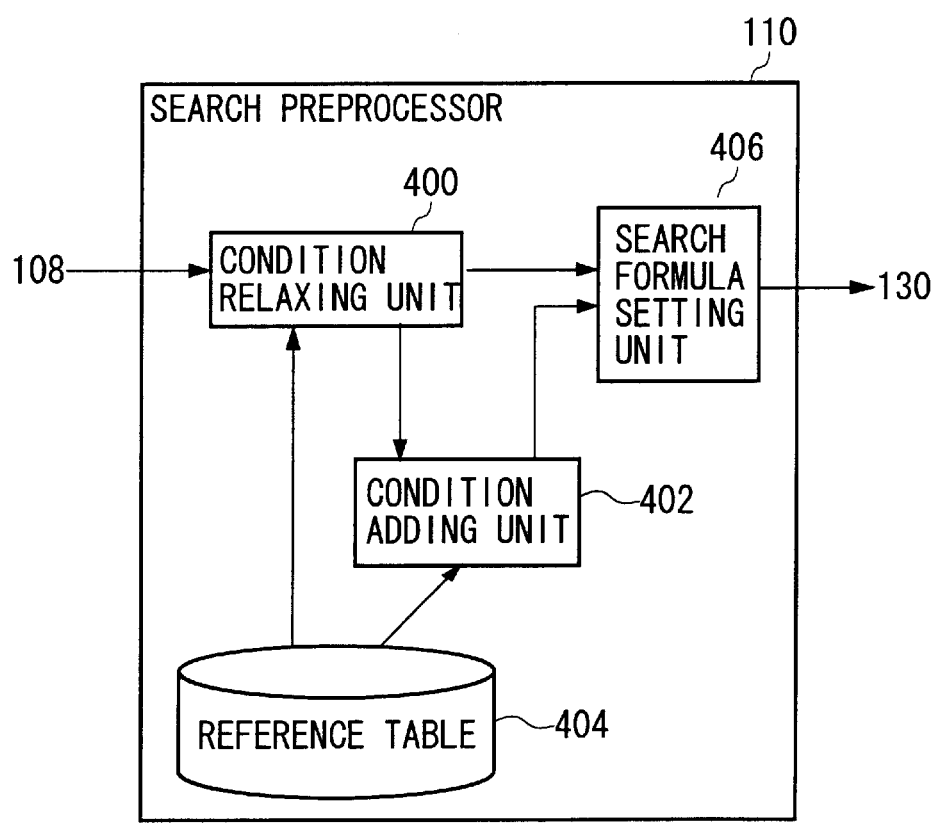
FIG. 13 shows an internal structure of the search-preprocessing unit 110.

FIG. 13 shows the internal structure of the search-preprocessing unit 110. The initial keywords extracted by the keyword-extracting unit 108 are sent to a condition-relaxing unit 400. The condition-relaxing unit 400 determines the keywords to be deleted by searching through a reference table 404. In the reference table 404, keywords that are known from the experience of past searches to have a markedly small number of hits are recorded as keywords that are too strict as a condition and therefore should be deleted. Hereinafter, the keywords thus deleted are referred to also as "invalid keywords". The condition-relaxing unit 400 sends the keywords remaining after such deletion (namely, the selected initial keywords) to a condition-adding unit 402 and a search formula-setting unit 406. The invalid keywords, too, are notified to the condition-adding unit 402.

The condition-adding unit 402 identifies objective keywords by consulting the reference table 404 about either the selected initial keywords, the invalid keywords, or both, and communicates them to the search formula-setting unit 406. The search formula-setting unit 406 takes the logical product (AND) of the selected initial keywords and the objective keywords and sends the search formula thus obtained to the search unit 130.

FIG. 14 shows an example of the internal data of the reference table 404. The reference table 404 comprises a keyword column 440, a deletion column 442, and an objective keyword column 444. Initial keywords are recorded in the keyword column 440 with a flag value of "1" to indicate invalid keywords in the deletion column 442. When the flag is "0," the initial keyword is allowed to remain as a selected keyword in the search formula. Recorded in priority order in the objective keyword column 444 are the objective keywords relative to each initial keyword, which are either determined from the experience of the past searches or selected voluntarily by an operator.

Figure 15:
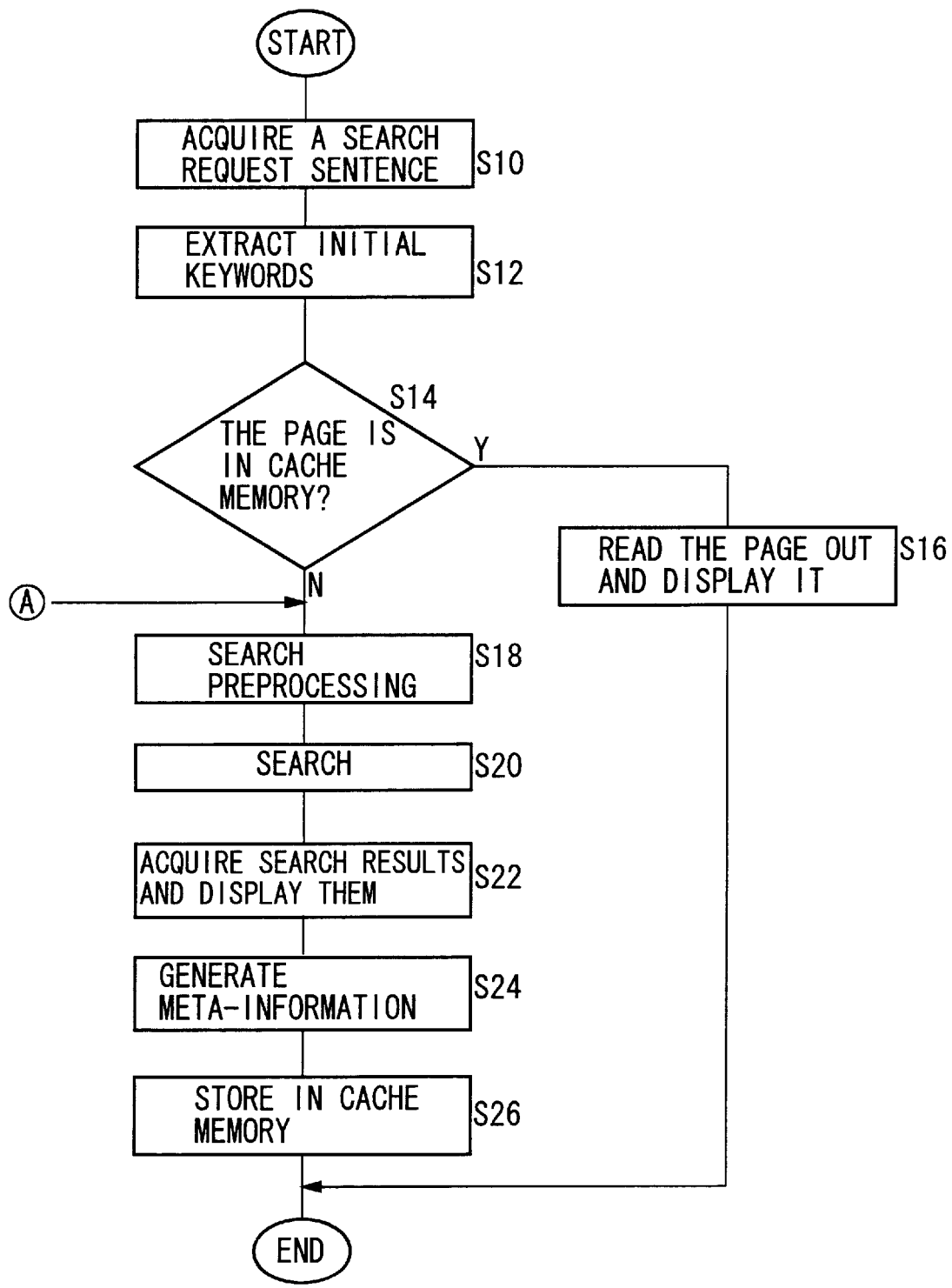
FIG. 15 shows steps of processing by the middle processor 14.

FIG. 15 shows steps of processing by the middle processor 14. First, for example, the user who wants to know some recipes for dishes using beef enters a search request sentence ("Please show me some recipes for dishes using beef.") addressed to a cooking agent. The search request sentence is acquired by the agent process-executing unit 106 (S10), and then the initial keywords, namely, "recipes," "dishes" and "beef," are extracted from the sentence (S12). These initial keywords are sent to the cache search unit 112, which conducts a search of the cache memory 120 (S14). If the desired pages are found therein (Y of S14), the pages are read out for display (S16).

On the other hand, when the desired pages are not found in the cache memory 120 (N of S14), the search-preprocessing unit 110 performs the preprocessing for a search (S18), which includes the identification of invalid keywords, the addition of objective keywords and the determination of a search formula, and based on the search preprocessing, the search unit 130 performs a page search accessing the Internet (S20).

The target pages discovered by the search are displayed via the search unit 130 (S22). The target pages are also sent to the meta-information generator 116, where meta-information is generated as a file in the format shown in FIG. 10 through the process of precheck, subject analysis and the extracting and presuming of meta-information (S24). The meta-information is then correlated with the target pages as shown in FIG. 11 or FIG. 12 so as to be stored in the cache memory 120 (S26).

Thus, information desired by the user can be promptly provided based on a search request sentence, which is inputted by the user from a rather subjective point of view. Especially with the addition and caching of meta-information, which is characteristic of the present embodiments, the search for information desirable to the user will end in a high rate of success when the pages desired by the user are present in the cache memory 120, and therefore the probability will be high that the pages read out from the cache memory 120 will satisfy the user. The meta-information generator 116, in particular, performs a precheck of pages to be cached so that caching is done rationally.

Figure 16:
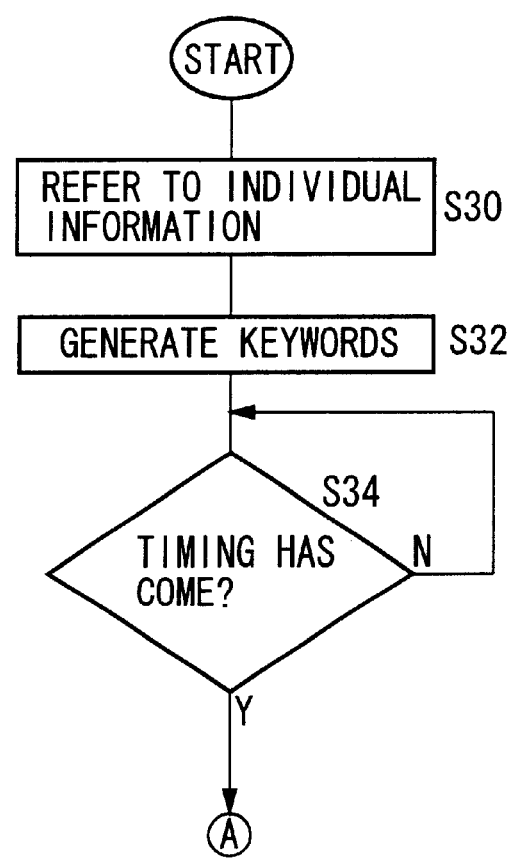
FIG. 16 shows pre-search steps taken in the background by the pre-search controller 114.

FIG. 16 shows pre-search steps taken in the background by the pre-search controller 114. Suppose that the user is now recording his/her daily diet into the apparatus according to the present invention, using the previously described health care function. Moreover, suppose that the personal information indicates that this user is fond of Chinese dishes and likes to cook by himself/herself (S30). In that case, the pre-search controller 114, after detecting the fact that the user has not eaten any Chinese dishes for a week, generates such keywords as "Chinese," "Cooking" and "Menu" by predicting that it is about time for the user to make an inquiry about the menu of Chinese dishes (S32).

Then, at a timing when the user does not use the present apparatus, such as during the night, the pre-search controller 114 recognizes that the timing has come for search in the background, and sends the previously generated keywords to the search-preprocessing unit 110. The subsequent processing is the same as that shown in FIG. 15 so that the pages to which the user may most likely direct his/her inquiries are cached in advance. Thus, this facility of responding quickly to requests from the user will result in a highly customized agent machine.

Moreover, if the user frequently accesses such pages as "Today's Stock Prices" and "Recommended Hot Spring Spas," then the pre-search controller 114 may function to cache these pages in advance. In such a case, the URLs for these pages, instead of the keywords, may be sent directly to the search unit 130 or the communication unit 132. When the user registers such that "I want to buy a PC now" is posted as individual information, the pre-search controller 114 may search for pages on computers or PCs, generate such meta-information as "CPU processing speed" and "memory capacity" and store it in the cache memory 120. In this case, when the user tries to access such information, the pages are read out locally from the cache memory 120 after a highly efficient search so that the user's convenience increases significantly. Accordingly, the structures and typical processing flows of the front processor 12, the middle processor 14 and the back processor 20 have been described. In the following, the procedures through which the user actually employs the specialized agents so as to receive services will be described.

Figure 17:
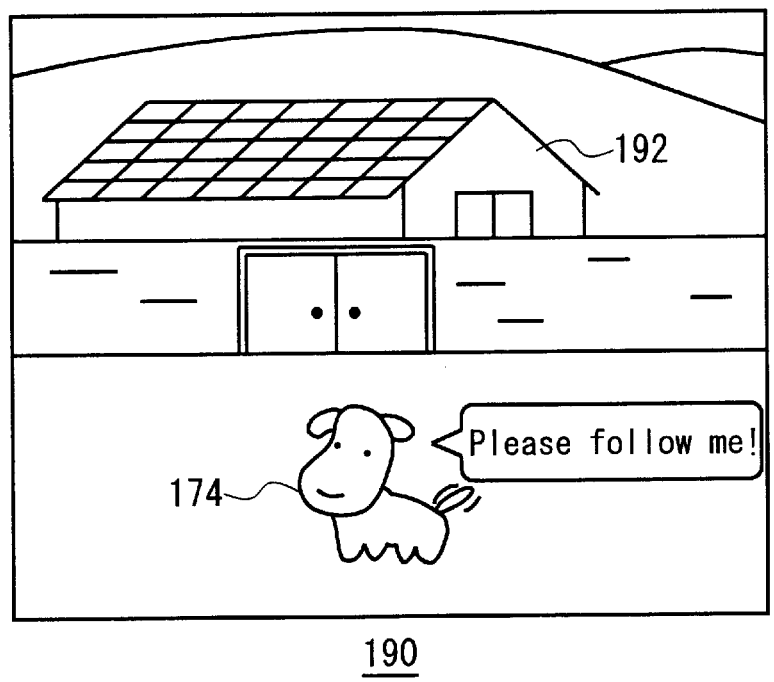
FIG. 17 illustrates a screen 190 that will appear first when the user receives a desired service using the PC 10.

FIG. 17 diagrammatically illustrates a screen 190 that will appear first when the user receives a desired service using the PC 10. On the screen 190, My Agent 174, in the form of a dog assigned to the user, appears and leads the user to a house 192 built in a virtual space.

Figure 18:
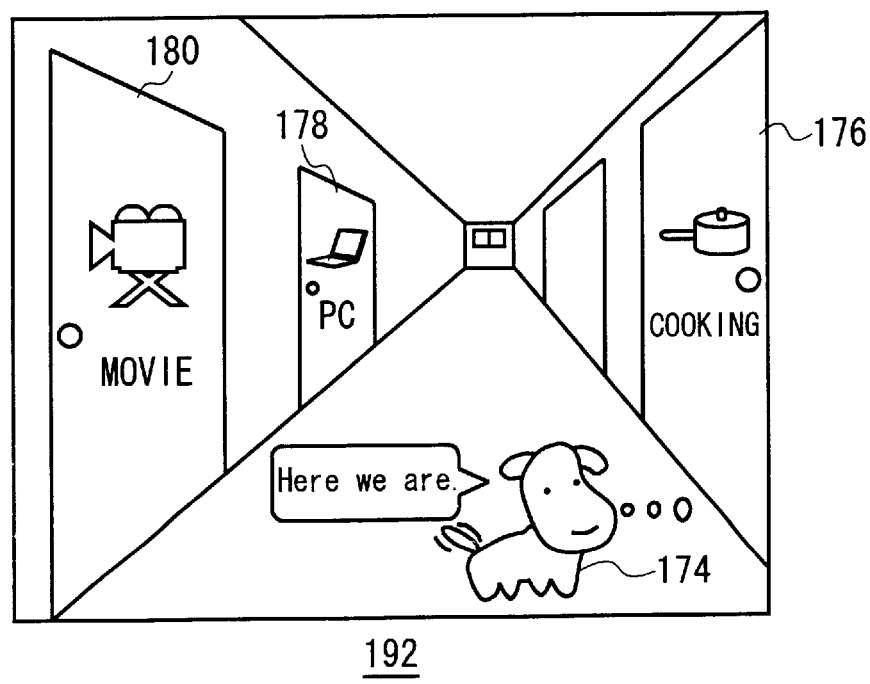
FIG. 18 illustrates a hallway provided inside the house 192 shown in FIG. 17.

FIG. 18 illustrates a hallway provided inside the house 192 shown in FIG. 17. Here, suppose that the user says to My Agent 174: "Please show me some recipes for dishes using beef". Then, My Agent 174 will obtain keywords, such as "recipes," "dishes" and "beef," through the morphological element analysis and specifies the room which may be the most closely related to these keywords from among all the rooms built into the house 192. In FIG. 18, there are Movie Room 180, PC Room 178 and Cooking Room 176 and so forth, and My Agent 174 is saying to the user "Here we are" upon deciding that the Cooking Room 176 is where the user wants to be. The user now enters the Cooking Room 176 by clicking it using a mouse or similar input device.

Figure 19:
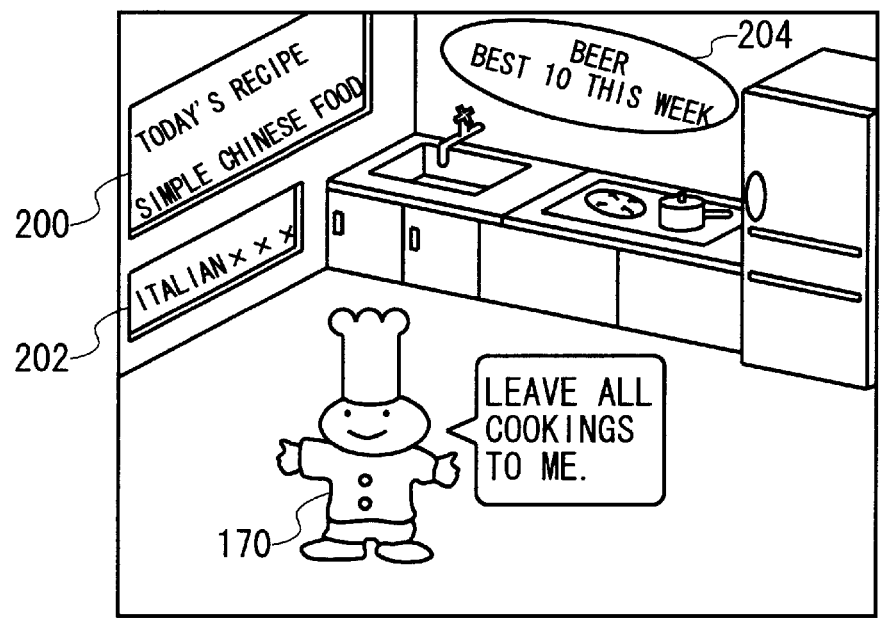
FIG. 19 shows the inside of the Cooking Room 176 shown in FIG. 18.

FIG. 19 shows the inside of the Cooking Room 176 shown in FIG. 18. In the Cooking Room 176, the Cooking Agent 170, who is a specialized agent, is on standby and engages in a dialog with the user to determine what the user wants. The Cooking Agent 170 has the appearance of a chef so that the user can associate him with cooking. In the other rooms, too, the specialized agents have their appearances associated with the concepts of their respective rooms.

In the Cooking Room 176, domains within the user's field of vision, such as the wall surfaces in this example, are embedded with an information section 200 showing "Today's recipe: Simple Chinese dish", a restaurant's PR section 202 showing "Italian x x x", a user-participating event section 204 showing "This week's best ten beer brands", and other sections. The user can access relevant Web pages by clicking on the sections. An operator of the Web server 18 can charge commissions on these advertisements; thus it is possible to set click-counting charges or fixed charges for a certain period of advertisement posting.

Figure 20:
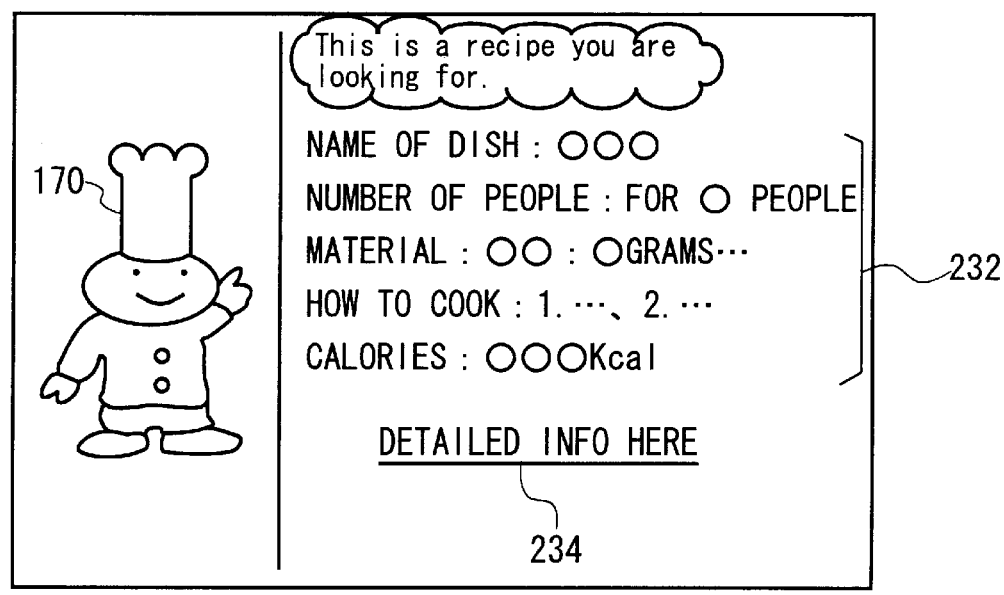
FIG. 20 shows a screen 230 on which the Cooking Agent 170 introduces cooking recipe in response to a user's inquiry.

When My Agent 174 guides the user into the Cooking Room 176, the user request of "Please show me some recipes for dishes using beef." has already been delivered to the Cooking Agent 170 so that his/her desired recipe is read from the Internet 16 or the cache memory 120 by the middle processor 14 and the back processor 20 and delivered to the Cooking Agent 170. FIG. 20 shows a screen 230 on which the Cooking Agent 170 shows the information thus acquired to the user. Under the caption of "This is a recipe you are looking for!", an actual recipe 232 is described, and a link 234 to more detailed information is also made available.

Figure 21:
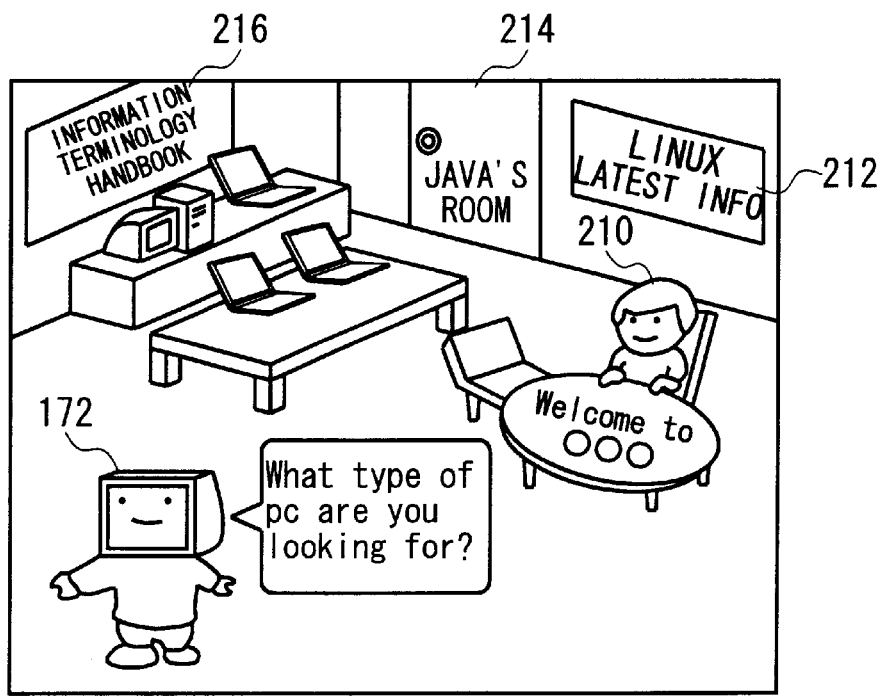
FIG. 21 shows the interior of the PC Room 178.

FIG. 21 shows the interior of the PC Room 178 into which the user has been led by My Agent 174 because the user made the request, "I want to buy a PC now". In this case, the PC Agent 172, who already knows the user's intention to buy, is asking: "What kind of a PC do you want to buy?" To this question, the user inputs some desired features of the PC and also answers more detailed questions asked by the PC Agent 172, thus helping the PC Agent determine the type of PC most suitable for the user. When the user reaches a final decision on the PC, he/she may place an order for it online via the PC Agent 172.

Referring to FIG. 21, the Sales Agent 210 is stationed permanently in the PC Room 178 as the sales person for Company ±±±. It is possible that the user accesses the Sales Agent 210 directly instead of the PC Agent 172. In such a case, a dialog will be held between the user and the sales person in the same manner as described above. Pasted on the walls of the PC Room 178 are an "Information Terminology Handbook" section 216, which is managed by the Web server 18, a "Linux Latest Info" section 212, as examples of PC topics or advertisement sections which may interest the user. Moreover, the PC Room 178 has a door 214 to "Java's Room," thereby subdividing the concept of PC into more detailed concepts. Sub-concepts such as "Java's Room", while its generic or original concept "PC" is taken as a parent concept to the sub-concepts, are realized by the data hierarchization of the PC Room 178 shown in FIG. 8.

According to the present embodiment, the e-mail address of the user who clicks on the "Linux Latest Info" section 212 is recorded in the mailing list 144 shown in FIG. 5 so that Linux product information is distributed to the user from the Web server 18 via the mail server 152.

Figure 22:
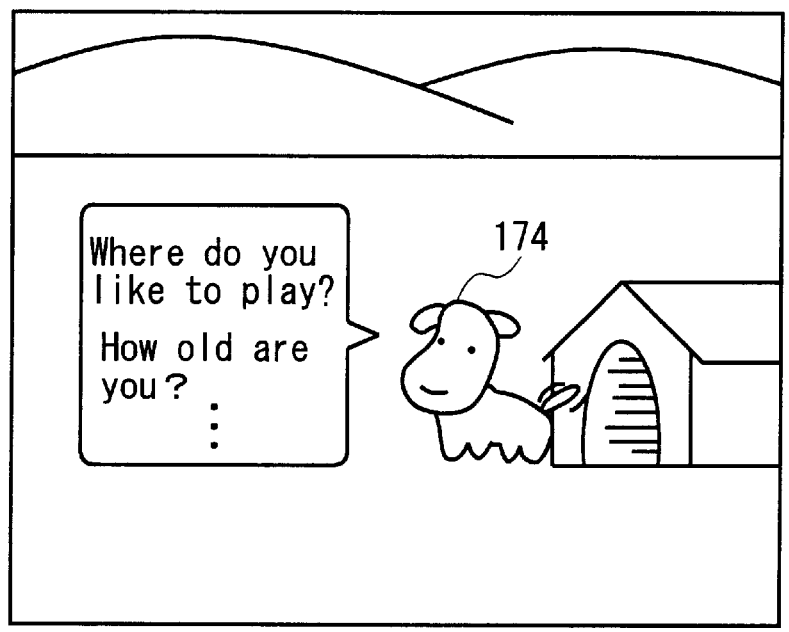
FIG. 22 shows a screen 220 that will appear when a user has called up My Agent 174 a predetermined number of times.

FIG. 22 shows a screen 220 that will appear when the user has called up My Agent 174 a predetermined number of times. The number of calls to My Agent 174 from the user is stored in the user information database 150 in the back processor 20. Initially, My Agent 174 is passively characterized to respond obediently to the requests of the user. After a certain number of calls from the user and thereafter, My Agent 174 begins to positively ask the user for personal information on the assumption that by this time the user may have begun to feel a sense of friendship toward My Agent 174. Here, My Agent 174 asks questions such as "Where do you want to play?" or "How old are you?" and the answers to these questions will be stored in the personal information database 118 in the middle processor 14 so that pages better suited to the user will be selected.

The present invention has been described based on the embodiments that are only exemplary. It is understood by those skilled in the art that there exist other various modifications to the combinations of each component and each process described and that such modifications are encompassed by the scope of the present invention.

In one such modification, a function with high amusement value can be added to the user support apparatus. For example, an arrangement may be introduced wherein points are added whenever the user accesses a specialized agent and the user is given a present from the operator of the Web server 18 when the points reach a certain total. Such an arrangement may be an inducement to increase the number of accesses by the users, which in turn will contribute to an increased profit from advertising charges. Moreover, a special agent called the "Premium Agent" may be hidden in one of the rooms so that a special present may be offered to the users who discover the Agent. In this case, the user may enjoy the search through the virtual space as a game.

In another example of such modifications, each specialized agent may be provided with the function of recording the dialog with each user in the user information database 150, and the function of classifying the user now in dialog into any of the types of past users based on the nature of the dialog. With this facility, each specialized agent can respond more quickly and more accurately to the user.

In still another example of such modifications, My Agent 174 may be provided with the function of recording the requests from the user in the user information database 150 while the back processor 20 may be provided with the function of searching for users who have the same tastes, behavioral patterns, living habits, and so forth, based on the above-described recording. With this facility, the same pages may be pushed to the meta-information generator 116 from the search unit 130 for other users on the assumption that different users who share similar characteristics will share interest in similar information.

In still another example of such modification, the 3-D object supply unit 134 may be provided with a function whereby the user himself/herself designs an agent who represents the user himself/herself. For example, the user gives a nickname to himself/herself, moves around in the virtual space and has a virtual dialog with a specialized agent.

In still another example of such modifications, a function may be added whereby the agent control unit 140 generates a large number of specialized agents and the user acquires one of them as his/her own. The structure may be such that the user possesses a popular agent, such as the hero or heroine of an animated movie, just as in a game.

In still another example of such modifications, the rooms corresponding to different concepts may be classified not only according to the topics or information which the user may be interested in, but also according to the attributes of the user himself/herself. For example, there may be rooms for exclusive use by females.

In still another example of such modifications, communication between the users may be promoted not only by structuring the mailing list 144, but also by generating a forum page or putting up a notice board in each room.

According to the present embodiments, information desired by the user can be retrieved and then put to active use easily and effectively. Moreover, the user can benefit from such facility in a friendlier environment.

Although the present invention has been described by way of exemplary embodiments, it should be understood that many changes and substitutions may be made by those skilled in the art without departing from the spirit and the scope of the present invention which is defined by the appended claims.

What is claimed is:
1. A user support apparatus, comprising:
 a front processor which handles data exchange between a user and the apparatus at an interface level;
 a middle processor which processes and stores information to be supplied to the user via said front processor; and
 a back processor which supplies the necessary information to said middle processor by externally acquiring the necessary information according to an instruction from said middle processor when the necessary information is not stored internally;
 said front processor including:
  an object storage unit which stores object data which describe a virtual three-dimensional space containing a plurality of virtual rooms, which respectively correspond to different concepts, and a personified specialized agent which performs a service related to the concept corresponding to each of the rooms; and
  a three-dimensional object outputting unit which displays the virtual three-dimensional space and the specialized agent to the user,
 wherein the specialized agent inquires of said middle processor about information necessary for providing the service when the service is requested by the user,
 wherein said middle processor reads out the necessary information, if stored internally, and supplies read-out information to the specialized agent,
 said middle processor comprising:
  a meta-information generator which analyzes the necessary information supplied from said back processor as a page which is a collected set of data, and generates meta-information relative to the page; and
  a write controller which relates the page to the meta-information, so as to be stored in a local memory device, and
 wherein said middle processor further includes a search preprocessing unit which performs a predetermined processing on a keyword reflecting user's preference,
 said search preprocessing unit including:
  a condition adding unit which adds an objective keyword according to a search preference of the user presumed from a keyword reflecting the user's preference; and
  a search formula setting unit which sets a conditional equation based on the keyword and the added keyword.

2. A user support apparatus, comprising:
 a front processor which handles data exchange between a user and the apparatus at an interface level;
 a middle processor which processes and stores information to be supplied to the user via said front processor; and
 a back processor which supplies the necessary information to said middle processor by externally acquiring the necessary information according to an instruction from said middle processor when the necessary information is not stored internally;
 said front processor including:
  an object storage unit which stores object data which describe a virtual three-dimensional space containing a plurality of virtual rooms, which respectively correspond to different concepts, and a personified specialized agent which performs a service related to the concept corresponding to each of the rooms; and a three-dimensional object outputting unit which displays the virtual three-dimensional space and the specialized agent to the user, wherein the specialized agent inquires of said middle processor about information necessary for providing the service when the service is requested by the user, wherein said middle processor reads out the necessary information, if stored internally, and supplies read-out information to the specialized agent, said middle processor comprising:
- a meta-information generator which analyzes the necessary information supplied from said back processor as a page which is a collected set of data, and generates meta-information relative to the page; and
- a write controller which relates the page to the meta-information, so as to be stored in a local memory device, wherein said middle processor further includes a search preprocessing unit which performs a predetermined processing on a keyword reflecting user's preference, said search preprocessing unit including:
- a condition adding unit which adds an objective keyword according to a search preference of the user presumed from a keyword reflecting the user's preference; and
- a search formula setting unit which sets a conditional equation based on the keyword and the added keyword, and wherein said middle processor further includes a pre-search controller which assumes information that the user will inquire based on user's personal data.

* * * * *

UNITED STATES PATENT AND TRADEMARK OFFICE
CERTIFICATE OF CORRECTION

PATENT NO. : 6,845,486 B2
DATED : January 18, 2005
INVENTOR(S) : T. Yamada et al.

It is certified that error appears in the above-identified patent and that said Letters Patent is hereby corrected as shown below:

Title page,
Item [73], Assignee, "Moriguchi" should read -- Osaka --.
Item [56], References Cited, OTHER PUBLICATIONS, insert
-- Ramsey Hage, "Voice-Enabled Interactive E-commerce", 1999, Masters Abstracts, Univ. of Ottawa, vol. 38/04, p. 106 (130 pages). --.

Signed and Sealed this

Seventh Day of February, 2006

JON W. DUDAS
*Director of the United States Patent and Trademark Office*